United States Patent [19]

Etzbach

[11] Patent Number: 4,681,699

[45] Date of Patent: Jul. 21, 1987

[54] BISAZO DYES AND THEIR USE IN LIQUID CRYSTALLINE MATERIALS

[75] Inventor: Karl-Heinz Etzbach, Frankenthal, Fed. Rep. of Germany

[73] Assignee: BASF Aktiengesellschaft, Ludwigshafen, Fed. Rep. of Germany

[21] Appl. No.: 776,461

[22] Filed: Sep. 16, 1985

[30] Foreign Application Priority Data

Sep. 15, 1984 [DE] Fed. Rep. of Germany ....... 3433927

[51] Int. Cl.[4] ............................................. C09K 19/00
[52] U.S. Cl. ................................ 252/299.1; 534/577; 350/349
[58] Field of Search .................... 252/299.1, 299.68; 350/349; 534/577, 649, 752, 756, 757, 763, 795

[56] References Cited

U.S. PATENT DOCUMENTS

| | | | |
|---|---|---|---|
| 3,221,005 | 11/1965 | Moore et al. | 534/757 |
| 3,221,006 | 11/1965 | Moore et al. | 534/795 |
| 3,732,201 | 5/1973 | Ramanathan | 534/610 |
| 4,565,424 | 1/1986 | Huffman et al. | 252/299.1 |

FOREIGN PATENT DOCUMENTS

158252 10/1985 European Pat. Off. ....... 252/299.61

OTHER PUBLICATIONS

Bloom et al., Mol. Cryst. Liq. Cryst., vol. 40, pp. 213–221, (1977).

*Primary Examiner*—Teddy S. Gron
*Assistant Examiner*—J. E. Thomas
*Attorney, Agent, or Firm*—Oblon, Fisher, Spivak, McClelland & Maier

[57] ABSTRACT

Novel compounds of the general formula I

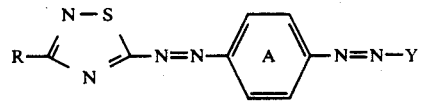

where R is hydrogen, unsubstituted or substituted alkyl, aralkyl, cycloalkyl, aryl, alkoxy, aralkoxy, cycloalkyloxy, aryloxy, alkylthio, aralkylthio or cycloalkylthio, Y is a radical of the formula (Abstract continued on next page.)

-continued

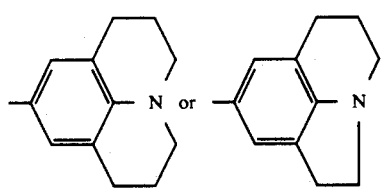

and the rings A and B may be further substituted or fused to a benzene ring, and $R^1$ and $R^2$ are each hydrogen or unsubstituted or substituted alkyl, aralkyl or cycloalkyl, or together with the nitrogen atom form piperidino, pyrrolidino or morpholino, and $R^3$ is hydrogen, alkyl, or cycloalkyl, are particularly useful as dyes in liquid-crystalline media.

8 Claims, 1 Drawing Figure

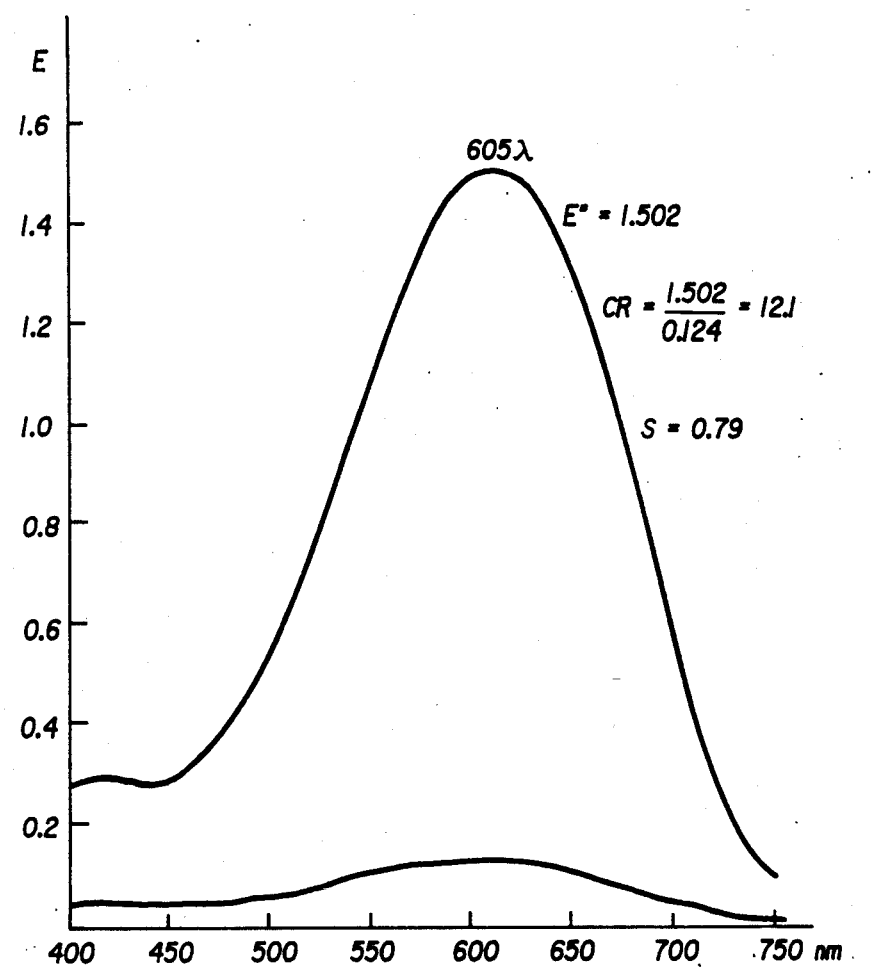

BISAZO DYES AND THEIR USE IN LIQUID CRYSTALLINE MATERIALS

SUMMARY OF THE INVENTION

The present invention relates to compounds of the general formula I

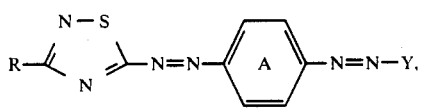

where R is hydrogen, unsubstituted or substituted alkyl, aralkyl, cycloalkyl, aryl, alkoxy, aralkoxy, cycloalkyloxy, aryloxy, alkylthio, aralkylthio or cycloalkylthio, Y is a radical of the formula

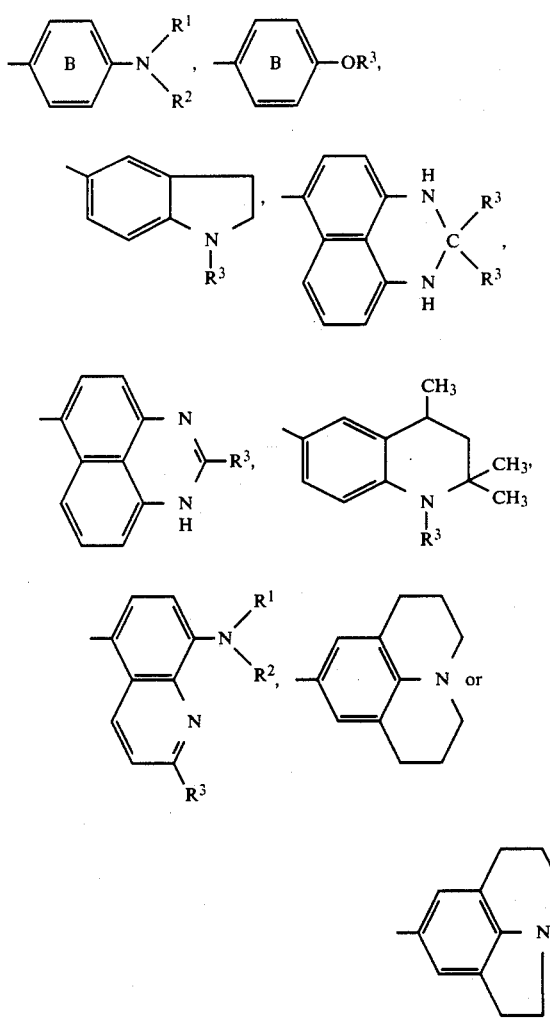

and the rings A and B may be further substituted or fused to a benzene ring, and $R^1$ and $R^2$ are each hydrogen or unsubstituted or substituted alkyl, aralkyl or cycloalkyl or together with the nitrogen atom form piperidino, pyrrolidino or morpholino, and $R^3$ is hydrogen, alkyl or cycloalkyl.

BRIEF DESCRIPTION OF THE DRAWINGS

FIG. 1 shows the extinctions $E\|$ and $E\bot$ for the compound of Example 18 in the liquid crystalline mixture ZLI 1957/5.

DETAILED DESCRIPTION OF THE PREFERRED EMBODIMENTS

Examples of suitable substituents for the ring A are chlorine, bromine, methyl, ethyl, methoxy, ethoxy, acetylamino, propionylamino or a fused benzene ring.

The ring B may carry as substituents, for example, chlorine, bromine, methyl, ethyl, methoxy, ethoxy, acetylamino, propionylamino or a fused benzene ring.

In addition to being hydrogen, $R^1$ and $R^2$ are each, for example, methyl, ethyl, propyl, butyl, hexyl, dodecyl, cyclohexyl, 2-phenylethyl, 2-cyanoethyl, 2-hydroxyethyl, 2-acetoxyethyl, 2-butyryloxyethyl, allyl, phenylmethyl or 4-butylphenylmethyl.

In addition to being hydrogen, $R^3$ is, for example, methyl, ethyl, butyl or cyclohexyl.

R is hydrogen or, for example, phenyl, phenylmethyl, phenylethyl, phenoxy, phenoxymethyl, phenoxyethyl, phenylmethylthio or phenylethylthio, the stated radicals being unsubstituted or substituted by $C_1$-$C_{24}$-alkyl, $C_1$-$C_{24}$-alkoxy, $C_1$-$C_{24}$-alkoxycarbonyl, $C_1$-$C_{24}$-acyloxy, $C_5$-$C_7$-cycloalkyl, 4-($C_1$-$C_{12}$-alkylcyclohexyl), phenyl, chlorine or bromine, or R is $C_5$-$C_7$-cycloalkyl or is $C_1$-$C_{24}$-alkylthio or $C_1$-$C_{24}$-alkyl which is unsubstituted or substituted by hydroxyl, $C_1$-$C_{24}$-alkoxy, $C_1$-$C_{24}$-alkoxycarbonyl, $C_1$-$C_{24}$-alkyl- or dialkylcarbamyl or $C_1$-$C_{24}$-acyloxy.

Examples of radicals R in addition to those stated above are 4-($C_1$-$C_{12}$-alkyl)-phenyl, 4-cyclohexylphenyl, 4-(4'-$C_1$-$C_7$-alkylcyclohexyl)-phenyl, 4-($C_1$-$C_{12}$-alkyl)phenylmethyl, 4-($C_1$-$C_{12}$-alkyl)-phenylethyl, 4-($C_1$-$C_{12}$-alkyl)-phenylmethylthio, 4-($C_1$-$C_{12}$-alkoxy)-phenylmethylthio, 4-($C_1$-$C_{12}$-alkoxycarbonyl)-phenylmethylthio, 4-($C_1$-$C_{12}$-alkanoyloxy)-phenylmethylthio, 4-cyclohexylphenylmethylthio, 4-(4'-$C_1$-$C_7$-alkylcyclohexyl)-phenylmethylthio and 4-($C_1$-$C_{12}$-alkyl)-phenylethylthio.

Examples of preferred substituents R are methyl, ethyl, propyl, butyl, 2-butyl, 3-heptyl, octyl, nonyl, dodecyl, methylthio, ethylthio, propylthio, butylthio, isobutylthio, tert.-butylthio, pentylthio, 2-methylbutylthio, hexylthio, 2-ethylhexylthio, octylthio, nonylthio, isononylthio, dodecylthio, phenylmethylthio, 4-($C_1$-$C_{12}$-alkyl)-phenylmethylthio, 4-cyclohexylphenylmethylthio, 4-($C_1$-$C_7$-alkylcyclohexyl)-phenylmethylthio, 4-($C_1$-$C_{12}$-alkyl)-phenyl and 4-(4'-$C_1$-$C_7$-alkylcyclohexyl)-phenyl.

The compounds of the formula I are particularly useful as pleochroic dyes in electrooptical liquid crystal displays of the guest-host type, and for the preparation of colored polarization films.

Liquid crystalline materials which contain pleochroic dyes are used in displays. The principles of the novel use are known, and are described in, for example, H. Kelker and R. Hatz, Handbook of Liquid Crystals, page 611 et seq (1980), R. J. Cox, Mol. Cryst. Liq. Cryst. 55 (1979), 51 et seq., and L. Pauls and G. Schwarz, Elektronik 14 (1982), 66 et seq. Further literature which describes the novel use in detail is referred to in the stated publications.

Dyes for liquid crystalline mixtures must meet a number of requirements (cf. for example J. Constant et al., J. Phys. D: Appl. Phys. 11 (1978), 479 et seq., F. Jones and T. J. Reeve, Mol. Cryst. Liq. Cryst. 60 (1980), 99 et seq., and European Patent Nos. 43,904, 55,838 and 65,869). They must not ionize in an electric field, must have a very high molar extinction coefficient ε and be readily soluble in the liquid crystal matrix used, must be chemically and in particular photochemically stable, and must possess a degree of order S as far as possible greater than 0.75 in the particular nematic phase in order to achieve good contrast of the guest-host display.

Violet and blue dyes which meet these requirements are predominantly those of the anthraquinone class (cf. for example Nos. EP-A-56492, EP-A-91225, DE-A-3028593, EP-A-54217 and DE-A-2902177).

Azo dyes known to date, in particular violet and blue ones, generally have the disadvantage that the degree of order, the solubility and the light stability are inadequate (cf. for example G. W. Gray, Chimia. 34 (1980), 47 et seq.).

Surprisingly, the novel violet and blue dyes have a very good degree of order coupled with high solubilities and in many cases adequate light stabilities in the particular liquid crystal matrix (eg. ZLI 1840, ZLI 1957/5, ZLI 2452, ZLI 2585 from Merck).

The use of dichroic dyes for the preparation of polarization films is described by, for example, R. Mizoguchi et al. in Displays, 4 (1983), 201 et seq., where further literature is also referred to.

The compounds of the formula I can be prepared by diazotizing a compound of the formula II

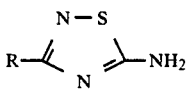

with, for example, nitrosylsulfuric acid in glacical acetic acid, and then reacting the product with a coupling component of the formula

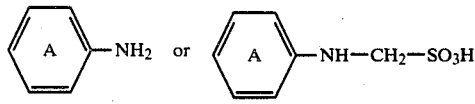

to give a compound of the formula

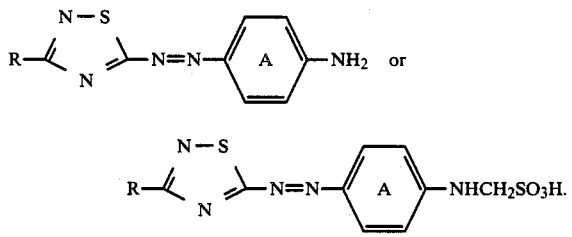

By diazotizing the monoazo compounds and then coupling the product with a compound of the formula HY, the compounds of the formula I are obtained.

The compounds of the formula II are prepared by a conventional method (cf. for example J. Goerdeler, Chem. Ber. 87 (1954), 57, J. Goerdeler, A. Huppertz and K. Wember Chem. Ber. 87 (1954), 69, J. Goerdeler and F. Bechlars, Chem. Ber. 88 (1955), 843, J. Goerdeler and M. Willig, Chem. Ber. 88 (1955), 1071, J. Goerdeler, J. Ohm and O. Tegtmeyer, Chem. Ber. 89 (1956), 1,535 and J. Goerdeler and P. Linden, Chem. Ber. 89 (1956), 2742).

The dyes can be purified by chromatography over silica gel using, for example, a toluene/ethyl acetate mixture as the mobile phase. They are then recrystallized, for example from toluene. The purity is monitored by thin-layer chromatography, HPLC and elemental analysis.

A typical method for preparing the dyes of the formula I is described in Example 1 below. Parts and percentages are by weight, unless stated otherwise.

Of particular importance are compounds of the formula Ia

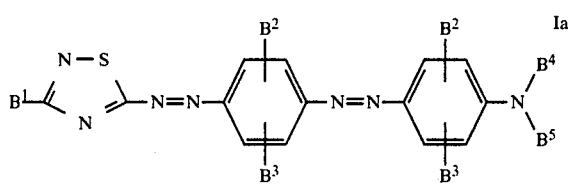

where $B^1$ is hydrogen, unsubstituted or substituted alkyl, aralkyl, cycloalkyl, aryl, alkylthio, aralkylthio or cycloalkylthio, $B^2$ and $B^3$ independently of one another are each hydrogen, methoxy or methyl, and $B^4$ and $B^5$ independently of one another are each hydrogen, $C_1$–$C_{24}$-alkyl, 2-phenylethyl, unsubstituted or substituted benzyl or cyclohexyl, or together with the nitrogen atom form pyrrolidino, piperidino or morpholino.

Other particularly important compounds are those of the formula Ib

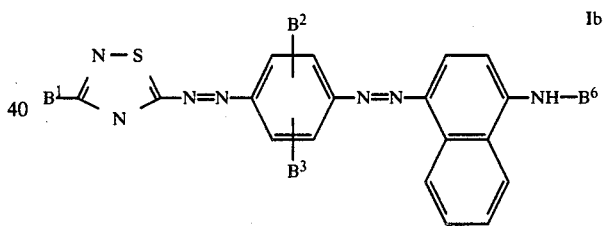

where $B^1$, $B^2$ and $B^3$ have the meanings given for formula Ia and $B^6$ is hydrogen, $C_1$–$C_{24}$-alkyl, 2-phenylethyl or unsubstituted or substituted cyclohexyl or benzyl.

$B^6$ is particularly preferably hydrogen, $C_1$–$C_{24}$-alkyl, cyclohexyl, 2-phenylethyl, benzyl, 4-($C_1$–$C_{24}$-alkyl)-benzyl, 4-cyclohexylbenzyl or 4-(4'-$C_1$–$C_{12}$-alkylcyclohexyl)-benzyl.

Other preferred compounds are those of the formula Ic

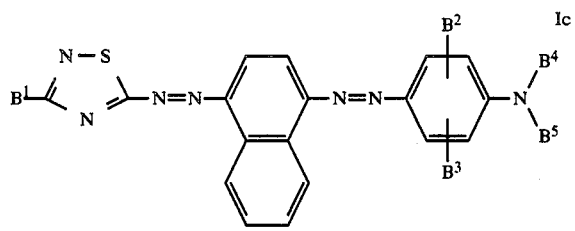

where $B^1$ to $B^5$ have the meanings given for formula Ia.

GENERAL METHOD OF PREPARATION

EXAMPLE 1

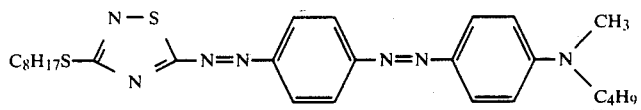

10.8 parts of 36% strength nitrosylsulfuric acid are added, at 5° C., to a mixture of 7.4 parts of 3-octyl-5-amino-1,2,4-thiadiazole (prepared as described by J. Goerdeler in Chem. Ber. 89 (1956), 2742), 70 parts of glacial acetic acid and 30 parts of propionic acid, and the mixture is stirred for a further 3 hours at 5° C.

The diazonium salt solution is then added, while cooling with ice, to a solution of 6.3 parts of sodium anilinomethanesulfonate, 1 part of amidosulfonic acid and 100 parts of water. The mixture is allowed to reach room temperature, after which it is stirred for a further 3 hours, and the resulting precipitate is filtered off under suction. The moist residue is taken up in 100 parts of ethanol and 30 parts of concentrated hydrochloric acid, and the mixture is heated at the boil for 0.5 hour. When the mixture has cooled, the monoazo dye of the formula

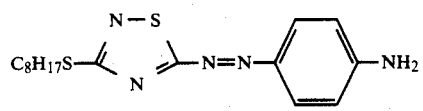

obtained in the form of the hydrochloride, is filtered off under suction and washed with water, then with a concentrated aqueous sodium acetate solution and then again with water. The filtration residue which has been thoroughly sucked dry is taken up in 70 parts of glacial acetic acid and 30 parts of propionic acid, after which first 9 parts of a 23% strength aqueous sodium nitrite solution and then 10 parts of concentrated hydrochloric acid are added to this solution at 5° C., and the mixture is stirred for 4 hours at this temperature. Thereafter, the diazonium salt solution is added to a mixture of 4.8 parts of N-butyl-N-methylaniline, 50 parts of isobutanol, 100 parts of a saturated aqueous sodium acetate solution and 200 parts of ice water. After the mixture has warmed up to room temperature, the resulting dye is filtered off under suction, washed with methanol and then with water and dried. 8 parts (51% of theory) of the crude dye of Example 1 are obtained, this dye being purified by chromatography over silica gel (Merck, silica gel 60, 0.063–0.0200 mm) using one part of a 40:1 toluene/ethyl acetate mixture as the eluent, followed by recrystallization from toluene/cyclohexane.

Mp.: 122° C., λ max (CH$_2$Cl$_2$): 565 nm.

| Example | Structure | M.p. | λ max (CH$_2$Cl$_2$) |
|---|---|---|---|
| 2 | CH$_3$S-thiadiazole-N=N-(3-methylphenyl)-N=N-(3-methylphenyl)-N(CH$_3$)$_2$ | 232° C. | 575 nm |
| 3 | CH$_3$S-thiadiazole-N=N-(2,5-dimethylphenyl)-N=N-(3-methylphenyl)-N(CH$_3$)$_2$ | 226° C. | 578 nm |
| 4 | C$_4$H$_9$S-thiadiazole-N=N-(2,5-dimethylphenyl)-N=N-(3-methylphenyl)-N(CH$_3$)$_2$ | 182° C. | 577 nm |
| 5 | C$_6$H$_5$-CH$_2$S-thiadiazole-N=N-(2,5-dimethylphenyl)-N=N-(3-methylphenyl)-N(CH$_3$)$_2$ | 224° C. | 580 nm |

-continued

| Example | Structure | M.p. | λ max (CH₂Cl₂) |
|---|---|---|---|
| 6 | CH₃S-(N=S,N thiadiazole)-N=N-(2,5-dimethylphenyl)-N=N-(3-methyl-4-[N(C₂H₅)(C₂H₄-O-C(O)-C₄H₉)]phenyl) | 134° C. | 578 nm |
| 7 | CH₃S-(N=S,N thiadiazole)-N=N-(2,5-dimethylphenyl)-N=N-(2-NHC(O)CH₃-4-N(C₂H₅)₂-phenyl) | 210° C. | 598 nm |
| 8 | C₈H₁₇S-(N=S,N thiadiazole)-N=N-(2,5-dimethylphenyl)-N=N-(3-methyl-4-N(CH₃)₂-phenyl) | 146° C. | 578 nm |
| 9 | CH₃S-(N=S,N thiadiazole)-N=N-(2-OCH₃-5-methylphenyl)-N=N-(3-methyl-4-N(CH₃)₂-phenyl) | 218° C. | 600 nm |
| 10 | CH₃S-(N=S,N thiadiazole)-N=N-(2,5-dimethoxyphenyl)-N=N-(3-methyl-4-N(CH₃)₂-phenyl) | 240° C. | 623 nm |
| 11 | CH₃S-(N=S,N thiadiazole)-N=N-(2,5-dimethylphenyl)-N=N-(4-N(CH₃)₂-naphthyl) | 181° C. | 549 nm |
| 12 | CH₃S-(N=S,N thiadiazole)-N=N-(2,5-dimethylphenyl)-N=N-(4-NHC₂H₅-naphthyl) | 227° C. | 597 nm |

-continued

| Example | Structure | M.p. | λ max (CH₂Cl₂) |
|---|---|---|---|
| 13 | $C_4H_9S$-thiadiazole-N=N-(2,5-dimethylphenyl)-N=N-naphthyl-$NHC_2H_5$ | 185° C. | 600 nm |
| 14 | $C_8H_{17}S$-thiadiazole-N=N-(2,5-dimethylphenyl)-N=N-naphthyl-$NHC_2H_5$ | 155° C. | 600 nm |
| 15 | $C_8H_{17}S$-thiadiazole-N=N-(2,5-dimethylphenyl)-N=N-naphthyl-NH-CH₂-phenyl-cyclohexyl-$C_4H_9$ | 165° C. | 592 nm |
| 16 | phenyl-CH₂S-thiadiazole-N=N-(2,5-dimethylphenyl)-N=N-naphthyl-$NHC_2H_5$ | 237° C. | 602 nm |
| 17 | (4-tert-butylphenyl)-CH₂S-thiadiazole-N=N-(2,5-dimethylphenyl)-N=N-naphthyl-$NHC_2H_5$ | 235° C. | 605 nm |
| 18 | $C_8H_{17}S$-thiadiazole-N=N-phenyl-N=N-naphthyl-NH-CH₂-phenyl-cyclohexyl-$C_4H_9$ | 176° C. | 588 nm |
| 19 | $C_8H_{17}S$-thiadiazole-N=N-(2,5-dimethylphenyl)-N=N-(2-methylquinolinyl)-NH-$C_8H_{17}$ | 206° C. | 607 nm |

-continued
| Example | Structure | M.p. | λ max (CH$_2$Cl$_2$) |
|---|---|---|---|
| 20 | | 179° C. | 604 nm |
| 21 | | 132° C. | 593 nm |
| 22 | | 85° C. | 558 nm |
| 23 | | 115° C. | 588 nm |
| 24 | | 121° C. | 600 nm |
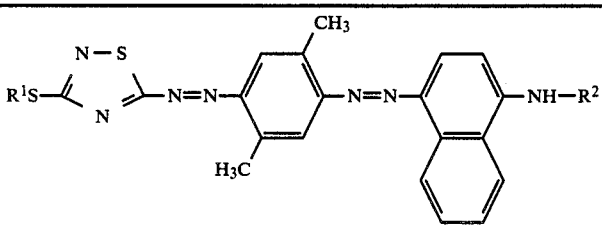
| Example | R$^1$ | R$^2$ | M.p. °C. | λ max (CH$_2$Cl$_2$) |
|---|---|---|---|---|
| 25 | CH$_3$ | C$_8$H$_{17}$ | 181 | 603 nm |
| 26 | CH$_3$ | C$_{12}$H$_{25}$ | 142 | 606 nm |
| 27 | C$_2$H$_5$ | C$_8$H$_{17}$ | 140 | 605 nm |
| 28 | C$_2$H$_5$ | C$_{12}$H$_{25}$ | 142 | 604 nm |
| 29 | C$_3$H$_7$ | C$_8$H$_{17}$ | 143 | 603 nm |
| 30 | C$_3$H$_7$ | C$_{12}$H$_{25}$ | 139 | 603 nm |
| 31 | C$_4$H$_9$ | C$_8$H$_{17}$ | 158 | 603 nm |

-continued

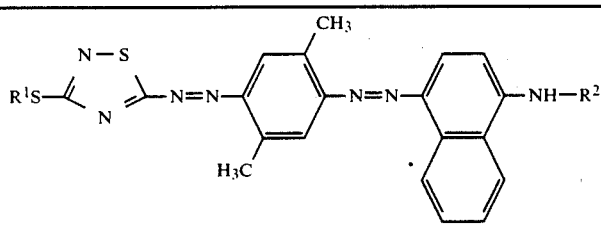

| Example | $R^1$ | $R^2$ | M.p. °C. | λ max $(CH_2Cl_2)$ |
|---|---|---|---|---|
| 32 | $C_4H_9$ | $C_{12}H_{25}$ | 145 | 603 nm |
| 33 | $C_5H_{11}$ | $C_8H_{17}$ | 138 | 603 nm |
| 34 | $C_5H_{11}$ | $C_{12}H_{25}$ | 132 | 603 nm |
| 35 | $C_7H_{15}$ | $C_{12}H_{25}$ | 113 | 605 nm |
| 36 | $C_8H_{17}$ | $C_8H_{17}$ | 120 | 602 nm |
| 37 | $C_8H_{17}$ | $C_{12}H_{25}$ | 113 | 605 nm |
| 38 | $C_2H_5$-CH($C_4H_9$)-$CH_2$- | $C_2H_5$ | 160 | 600 nm |
| 39 | $C_{12}H_{25}$ | $C_8H_{17}$ | 137 | 603 nm |
| 40 | $C_{12}H_{25}$ | $C_{12}H_{25}$ | 112 | 603 nm |
| 41 | $C_8H_{17}$ | $-CH_2-CH_2-C_6H_5$ | 131 | 598 nm |
| 42 | $C_8H_{17}$ | $-CH_2-C_6H_4-C_5H_{11}$ | 159 | 594 nm |
| 43 | $C_8H_{17}$ | $-C_6H_4-C_4H_9$ | 137 | 592 nm |

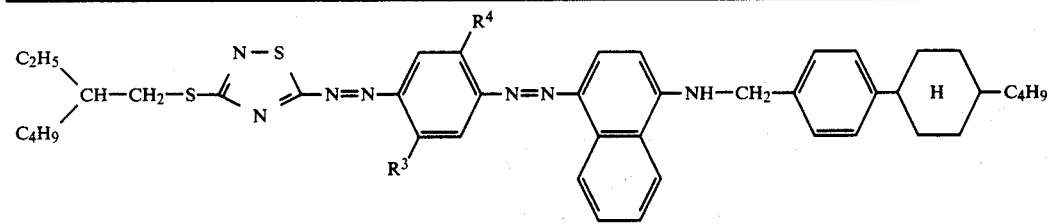

| Example | $R^3$ | $R^4$ | M.p. °C. | λ max $(CH_2Cl_2)$ |
|---|---|---|---|---|
| 44 | H | H | 164 | 588 nm |
| 45 | $CH_3$ | H | 180 | 593 nm |
| 46 | $CH_3$ | $CH_3$ | 177 | 593 nm |

TABLE 1

| Example | Degree of order S (at room temperature) | Solubility L (at room temperature) | Liquid crystal mixture |
|---|---|---|---|
| 1 | 0.72 | 1.5% | ZLI 1957/5 |
| 4 | 0.73 | 0.9% | ZLI 1840 |
| 5 | 0.74 | 0.3% | ZLI 1840 |
| 8 | 0.73 | 1.5% | ZLI 1957/5 |
|   | 0.76 | — | ZLI 2452 |
| 12 | 0.72 | 0.7% | ZLI 1840 |
| 15 | 0.77 | 1.4% | ZLI 1957/5 |
|   | 0.81 | 2.8% | ZLI 2452 |
|   | 0.74 | 2.8% | ZLI 2585 |
| 18 | 0.79 | 0.9% | ZLI 1957/5 |

The degree of order S measured at room temperature, the solubility L likewise determined at room temperature, and the Merck liquid crystal mixtures used are summarized in Table 1 for Examples 1, 4, 5, 8, 12, 15 and 18.

The values for the degree of order and the solubility which have been measured at room temperature in ZLI 2452 are summarized in Table 2 for some of the Examples 19–46.

TABLE 2

| Example | Degree of order S (at room temperature) | Solubility L (at room temperature) |
|---|---|---|
| 19 | 0.75 | 0.6% |
| 22 | 0.77 | 1.7% |
| 26 | 0.76 | 1.3% |
| 35 | 0.79 | 0.6% |
| 36 | 0.77 | 0.8% |

TABLE 2-continued

| Example | Degree of order S (at room temperature) | Solubility L (at room temperature) |
| --- | --- | --- |
| 38 | 0.74 | >5% |
| 40 | 0.77 | 1.2% |
| 41 | 0.74 | 0.6% |
| 42 | 0.80 | 0.4% |
| 43 | 0.71 | 3.2% |
| 44 | 0.81 | 2.6% |
| 45 | 0.81 | 2.4% |
| 46 | 0.80 | 0.8% |

The degree of order S was determined on the basis of the known equation $$S = \frac{CR - 1}{CR + 2}$$

in a commercial measuring cell with a homogeneous orientation (polyimide). The dichroic ratio CR was determined by measuring the extinctions $E\|$ (measured with light polarized parallel to the preferred direction of the nematic phase) and $E\perp$ (measured with light polarized perpendicular to the preferred direction of the nematic phase) and using the relationship $CR = E\|/E\perp$, the dye concentrations being chosen so that $E\|$ was from 1 to 2. The measurements were carried out using an Acta CIII spectrophotometer from Beckmann.

FIG. 1 shows the extinctions $E\|$ and $E\perp$ for the compound of Example 18 in ZLI 1957/5.

The solubility was determined as described below. 50 mg of the particular dye was stirred for 1 week at room temperature in 1 ml of liquid crystal, the saturated solution was centrifuged off from the residue, and the solubility was determined by comparison of extinctions.

The light stability of the dyes in the particular liquid crystal was determined by high-speed exposure of the solution in the measuring cell in a Suntest apparatus (Hanau) at 25° C. The dyes exhibited good photostability, particularly when a UV protective coating was used.

We claim:

1. A liquid crystal composition, comprising a bisazo dye which contains a 1,2,4-thiadizole ring, said bisazo dye being of the formula I:

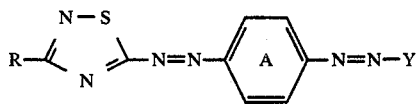

wherein:
R is hydrogen, or phenyl, phenylmethyl, phenylethyl, phenoxy, phenoxymethyl, phenoxyethyl, phenylmethylthio, or phenylethylthio radical, wherein the said radicals are either unsubstituted or substituted by $C_1$-$C_{24}$-alkyl, $C_1$-$C_{24}$-alkoxy, $C_1$-$C_{24}$-alkoxycarbonyl, $C_1$-$C_{24}$-acyloxy, $C_5$-$C_7$-cycloalkyl, 4-($C_1$-$C_{12}$-alkylcyclohexyl), phenyl, chlorine or bromine, or
R is $C_5$-$C_7$-cycloalkyl or a $C_1$-$C_{24}$-alkylthio or $C_1$-$C_{24}$-alkyl, each of which is unsubstituted or substituted by hydroxyl, $C_1$-$C_{24}$-alkoxy, $C_1$-$C_{24}$-alkoxycarbonyl, $C_1$-$C_{24}$-alkylcarbamyl, $C_1$-$C_{24}$-dialkylcarbamyl, or $C_1$-$C_{24}$-acyloxy,
Y is a radical of the formula:

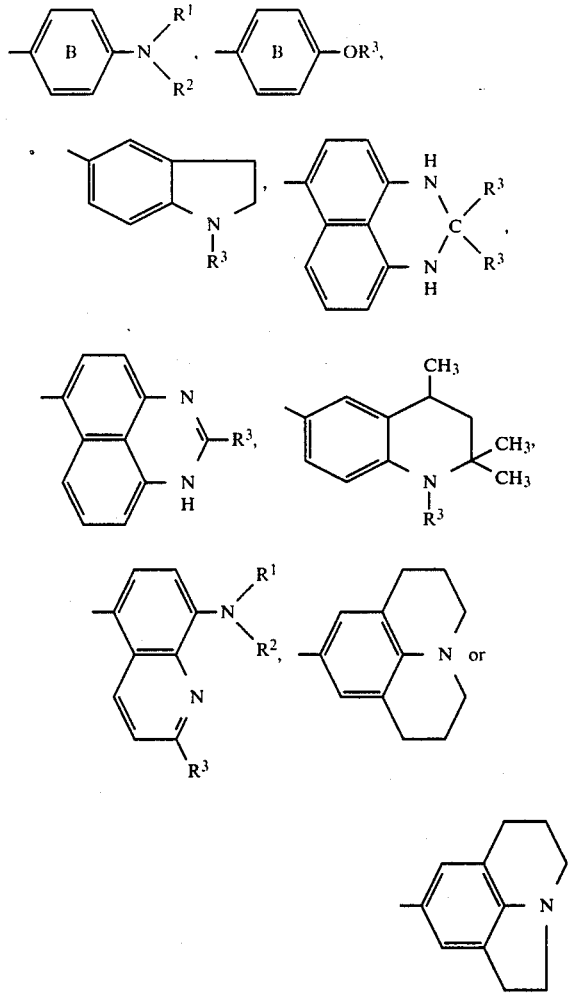

ring A is unsubstituted or substituted by chlorine, bromine, methyl, ethyl, methoxy, ethoxy, acetylamino, propionylamino, or ring A is fused to a benzene ring,
ring B is unsubstituted or substituted by chlorine, bromine, methyl, ethyl, methoxy, ethyoxy, acetylamino, propionylamino, or ring B is fused to a benzene ring;
$R_1$ and $R_2$ are each independently hydrogen, unsubstituted $C_1$-$C_{24}$ alkyl, $C_1$-$C_{24}$ alkyl substituted by cyano, hydroxy, acetoxy, or butyryloxy substituent, cyclohexyl, 2-phenylethyl, unsubstituted benzyl, benzyl substituted by $C_1$-$C_{24}$-alkyl, cyclohexyl or $C_1$-$C_{12}$-alkyl-cyclohexyl substituent, allyl, or together with the nitrogen atom $R_1$ and $R_2$ form a piperidino, pyrrolidino or morpholino radical; and, $R_3$ is hydrogen, $C_1$-$C_{24}$-alkyl, or cyclohexyl.

2. The composition of claim 1, wherein $R_1$ and $R_2$ are each independently hydrogen, methyl, ethyl, propyl, butyl, hexyl, dodecyl, cyclohexyl, 2-phenylethyl, 2-cyanoethyl, 2-hydroxyethyl, 2-acetoxyethyl, 2-butyryloxyethyl, allyl, phenylmethyl, or 4-butylphenylmethyl; and $R_3$ is hydrogen, methyl, ethyl, butyl or cyclohexyl.

3. The composition of claim 1, comprising a bisazo dye of the formula:

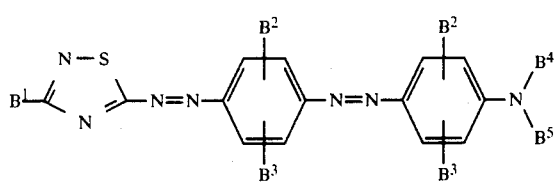

wherein:
- $B^1$ is hydrogen, unsubstituted or substituted alkyl, aralkyl, cycloalkyl, aryl, alkylthio, aralkylthio or cycloalkylthio;
- $B^2$ and $B^3$ are independently hydrogen, methoxy, or methyl; and
- $B^4$ and $B^5$ independently are hydrogen, $C_1$–$C_{24}$-alkyl, 2-phenylethyl, unsubstituted or substituted benzyl, or cyclohexyl, or together with the nitrogen atom, $B^4$ and $B^5$ form a pyrrolidino, a piperidino, or a morpholino radical.

4. The composition of claim 1, comprising a bisazo dye of the formula:

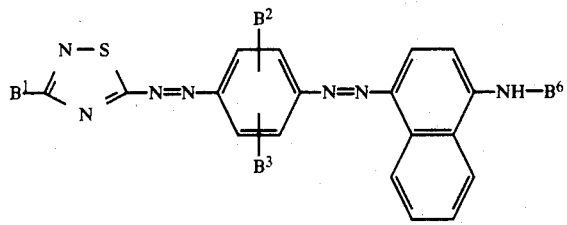

wherein:
- $B^1$ is hydrogen, unsubstituted or substituted alkyl, aralkyl, cycloalkyl, aryl, alkylthio, aralkylthio or cycloalkylthio;
- $B^2$ and $B^3$ are each independently hydrogen, methoxy, or methyl; and,
- $B^6$ is hydrogen, $C_1$–$C_{24}$-alkyl, 2-phenylethyl, unsubstituted cyclohexyl, substituted cyclohexyl, unsubstituted benzyl, or substituted benzyl.

5. The composition of claim 1, comprising a bisazo dye of the formula

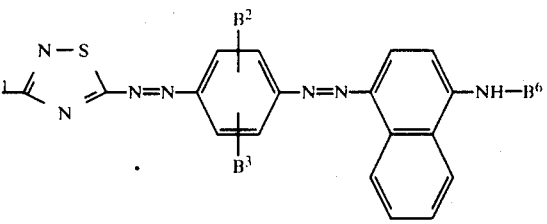

wherein:
- $B^1$ is hydrogen, unsubstituted or substituted alkyl, aralkyl, cycloalkyl, aryl, alkylthio, aralkylthio, or cycloalkylthio;
- $B^2$ and $B^3$ are each independently hydrogen, methoxy, or methyl; and,
- $B^6$ is hydrogen, $C_1$–$C_{24}$-alkyl, cyclohexyl, 2-phenylethyl, benzyl, 4-($C_1$–$C_{24}$-alkyl)benzyl, 4-cyclohexylbenzyl, or 4-(4'-$C_1$–$C_{12}$-alkylcyclohexyl)benzyl.

6. The composition of claim 1, comprising a bisazo dye of the formula

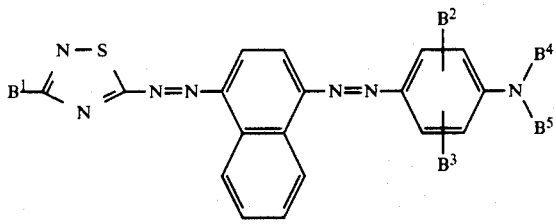

wherein:
- $B^1$ is hydrogen, unsubstituted or substituted alkyl, aralkyl, cycloalkyl, aryl, alkylthio, aralkylthio, or cycloalkylthio;
- $B^2$ and $B^3$ are each independently hydrogen, methoxy, or methyl; and,
- $B^4$ and $B^5$ are each independently hydrogen, $C_1$–$C_{24}$-alkyl, 2-phenylethyl, unsubstituted benzyl, substituted benzyl, unsubstituted cyclohexyl or substituted cyclohexyl, or together with the nitrogen atom to which they are bound, $B^4$ and $B^5$ form a pyrrolidino, piperidino, or morpholino radical.

7. The composition of claim 1, wherein R is 4-($C_1$–$C_{24}$-alkyl)phenyl, 4-cyclohexylphenyl, 4-(4'-$C_1$–$C_7$-alkylcyclohexyl)phenyl, 4-($C_1$–$C_{12}$-alkyl)phenylmethyl, 4-($C_1$–$C_{21}$-alkyl)phenylethyl, 4-($C_1$–$C_{12}$-alkyl)phenylmethylthio, 4-($C_1$–$C_{12}$-alkoxy)phenylmethylthio, 4-($C_1$–$C_{12}$-alkoxycarbonyl)phenylmethylthio, 4-($C_1$–$C_{12}$-alkanoyloxy)phenylmethylthio, 4-cyclohexyl-phenylmethylthio, 4-(4'-$C_1$–$C_7$-alkylcyclohexyl)phenylmethylthio or 4-($C_1$–$C_{12}$-alkyl)phenylethylthio.

8. The composition of claim 1, wherein $R_1$ and $R_2$ are independently $C_7$–$C_{11}$-aralkyl.

* * * * *